United States Patent [19]

Nelson

[11] 4,122,985
[45] Oct. 31, 1978

[54] TAPE CARTRIDGE WITH SELF-ALIGNING TAPE TRANSPORT ROLLER

[75] Inventor: Norman E. Nelson, Roseville, Minn.

[73] Assignee: Minnesota Mining and Manufacturing Company, St. Paul, Minn.

[21] Appl. No.: 854,601

[22] Filed: Nov. 25, 1977

Related U.S. Application Data

[63] Continuation of Ser. No. 708,377, Jul. 26, 1976, abandoned.

[51] Int. Cl.² ............................................. B65H 17/20
[52] U.S. Cl. .................................... 226/181; 226/192; 226/194; 242/55.19 A; 308/18
[58] Field of Search ............... 226/181, 194, 192, 191, 226/186, 190, 179, 180, 187, 15, 18, 21; 242/55.19 A, 199; 308/18, 20; 271/272, 273, 274

[56] References Cited

U.S. PATENT DOCUMENTS

| | | | |
|---|---|---|---|
| 3,069,058 | 12/1962 | Haff | 226/194 X |
| 3,403,868 | 10/1968 | Lear | 242/55.19 A |
| 3,482,792 | 12/1969 | Auld | 242/55.19 A |
| 3,486,675 | 12/1969 | Krechman | 226/181 X |
| 3,490,670 | 1/1970 | Carrell et al. | 226/187 |
| 3,542,303 | 11/1970 | Auld | 242/55.19 A |
| 3,642,229 | 2/1972 | Downey et al. | 242/199 |
| 3,662,937 | 5/1972 | Borman | 226/194 |

*Primary Examiner*—Bruce H. Stoner, Jr.
*Attorney, Agent, or Firm*—Cruzan Alexander; Donald M. Sell

[57] ABSTRACT

A tape cartridge is formed with a rotatable tape transport roller having a cylindrical exterior surface and a central bore into which protrudes a node from each inner sidewall of the cartridge to serve as trunnion axes for supporting the roller therein. In a preferred embodiment, the trunnion axes have an inward slant away from the central bore of the roller so that axial movement of the roller will produce a canting thereof to compensate for misalignment between the cartridge and components of a record/reproduce player in which the cartridge may be inserted.

3 Claims, 5 Drawing Figures

TAPE CARTRIDGE WITH SELF-ALIGNING TAPE TRANSPORT ROLLER

This is a continuation, of Application Ser. No. 708,377 filed July 26, 1976, now abandoned.

BACKGROUND OF THE INVENTION

1. Field of the Invention

The present invention relates in general to magnetic tape recording cartridges and more specifically to magnetic tape cartridges having rotatable tape transport rollers.

2. Description of the Prior Art

Typical tape cartridges include a case with spaced apart sidewalls, at least one tape supporting spool rotatably disposed between the case sidewalls, and multiple tape guiding members, at least one of which may be a roller that is rotatable about a pin mounted in the case. In the type of magnetic tape cartridge commonly referred to in the industry as "8-track cartridge" one rotatable guide roller of the cartridge also serves as a "pinch" roller to support the tape against pressure exerted thereon by a capstan of the record/reproduce player in which the cartridge is inserted and to provide tape transport.

It has been found that if the capstan of the tape player and the pinch roller of the cartridge are not in precise alignment with one another, performance characteristics of the cartridge are degraded. Heretofore known cartridges such as those described in U.S. Pat. Nos. 3,482,792 and 3,403,868 have included pinch rollers that maintain a fixed, but not necessarily coincident alignment with a record/reproduce player capstan. Accordingly, alignment between tape players and known 8-track cartridges is completely dependent upon how a particular cartridge construction is aligned with a player capstan. Often-times incorrect alignment occurs because of cartridge and player variation.

There is thus a need in the industry for a cartridge that will provide correct alignment between the cartridge pinch roller and the capstan of a tape player despite variations of the interface of the cartridge with the player.

SUMMARY OF THE INVENTION

The present invention provides a magnetic tape cartridge for employment in a record/reproduce tape player and includes a case with spaced apart sidewalls having nodes protruding therefrom for extending into a central bore of a tape transport roller to rotatably support the roller within the cartridge. The nodes may be formed with an inward slant or else portions of the sidewall forming the bore of the roller may be cut away in order that axial movement of the roller will produce canting thereof to compensate for misalignment between the cartridge and a player in which the cartridge is inserted.

The above construction provides a roller that is particularly useful in 8-track cartridges because it has a self-aligning capability to provide a precise alignment with a capstan of a tape player. When a cartridge of the present invention is inserted into a tape player, misalignment of the cartridge with player is compensated for by tilting of the pinch roller into a precise alignment with the capstan of the player.

DESCRIPTION OF THE PREFERRED EMBODIMENT

The present invention provides a magnetic tape cartridge having a tape transport pinch roller that is capable of adjusting its axis in order to move into proper alignment with the capstan of a record/reproduce magnetic tape player or magnetic recording and/or reproducing machine. As a result, the present invention is particularly useful for employment in the form of a magnetic 8-track cartridge, but it should be understood that the present invention is not limited to such use and may be utilized in a wide variety of other magnetic tape cartridge applications.

Figure 1:
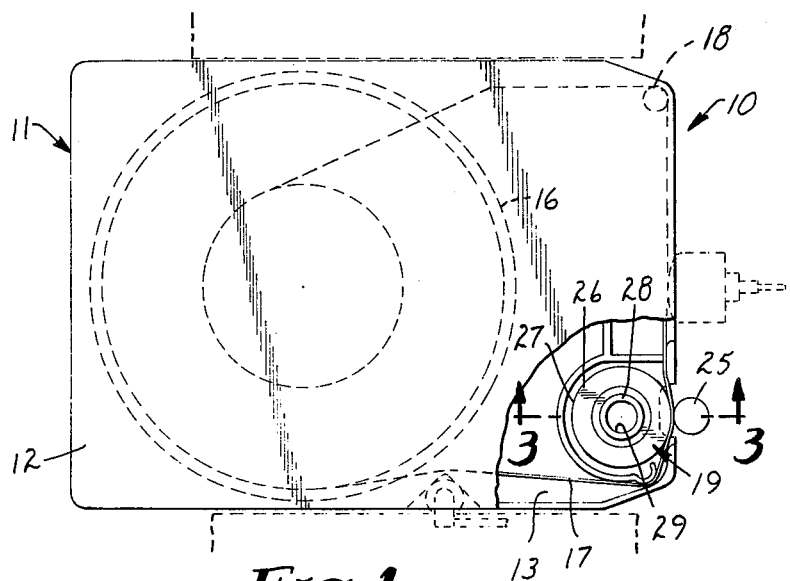
FIG. 1 is a plan view of a magnetic tape cartridge of the present invention with a portion of the cartridge housing cut away to expose a pinch roller of the cartridge shown in alignment with a capstan of a record/reproduce tape player and with the remaining internal components of the cartridge indicated with dotted lines.

Referring now to the drawings, FIG. 1 illustrates a magnetic tape 8-track cartridge 10 that is formed from a substantially rectangular hollow plastic case 11 having a pair of casing members 12 and 13 that may be held together by ultrasonic welding, screws or other suitable fastening methods. The casing members 12 and 13 each include substantially planar surfaces sufficiently spaced apart from one another to accommodate a reel 16 and magnetic tape 17 arranged in an endless array within the cartridge.

During operation of the cartridge 10 in a record/reproduce player the tape 17 travels from the reel 16 to a tape guide 18 and then to a tape transport roller 19 that serves as a pinch roller for supporting the tape 17 against pressure exerted thereon by a capstan 25 of a record/reproduce magnetic tape player in which the cartridge 10 may be inserted. After passing the pinch roller 19 the tape returns to the reel 16. The pinch roller 19 and guide 18 are disposed in opposite corners of one end of the cartridge 10 in order that the tape 17 is moved in a generally parallel direction to one end of the cartridge 10 partially open for engaging a magnetic transducer of the player within which the cartridge 10 may be inserted.

To produce transport of the tape 17, standard tape players in which the cartridge may be inserted include the capstan 25, as described in U.S. Pat. No. 3,437,762 incorporated herein by reference. Typical tape cartridges that are already known in the art are somewhat similar to the cartridge 10; however, the cartridge 10 differs from heretofore known tape cartridges by the means by which the pinch roller 19 is mounted within the case 11.

Figure 2:
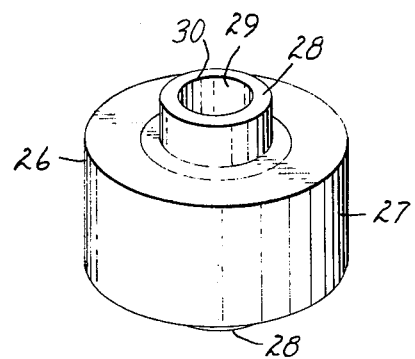
FIG. 2 is an enlarged side view in perspective of the pinch roller shown in FIG. 1.

Referring now to FIG. 2, it can be seen that the pinch roller 19 is formed with a cylindrical body portion 26 with a tape engaging exterior surface 27. Hubs or endwalls 28 protrude from the central portion of the ends of the body portion 26 and there is an axial bore 29 through the roller 19 with inlet edges of the bore 29 at each end of the roller 19 providing spaced circular edge bearing surfaces 30 adapted to engage bearing surfaces in the case 11. It is preferable to form the roller 19 as an integral plastic member, but for certain applications, it may be advantageous for the exterior surface 27 to be formed from rubber or some such other resilient elastomeric material to eliminate slippage between the tape 17 and the surface 27.

Figure 3:
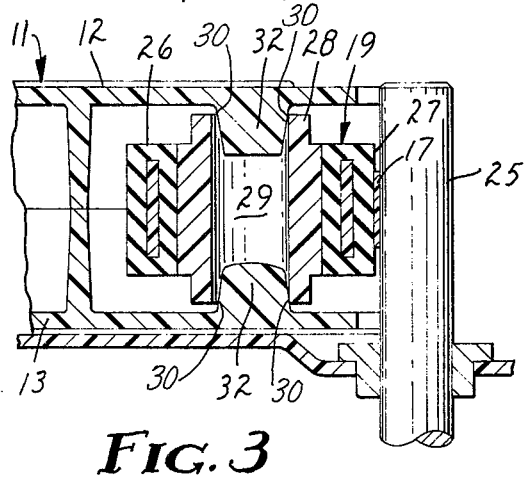
FIG. 3 is an enlarged view in cross section taken through the plane 3—3 of FIG. 1 and indicating a disposition of the pinch roller of FIG. 2 in the cartridge engaging a capstan of a record/reproduce player.

Referring now to FIG. 3, the disposition of the roller 19 in the case 11 is illustrated. The roller 19 is mounted between the casing members 12 and 13 by means of frustoconical nodes 32 that respectively protrude and decrease in diameter from the members 12 and 13 into the roller bore 29. Frusto-conical outer surfaces of the nodes 32 provide bearing surfaces against which the circular edge bearing surfaces 30 bear to rotatably support the roller 19 in the case 11 against pressure applied at one side of the roller 19 as by the drive capstan 25 when the cartridge 10 is inserted in the machine. The circular edge bearing surfaces 30 are larger in diameter than the diameter of the nodes 32 so that they engage the nodes 32 at only one position around their periphery, and the planar surfaces of the casing members 12 and 13 are sufficiently spaced apart to permit axial movement of the roller 19 on the nodes 32.

Figure 4:
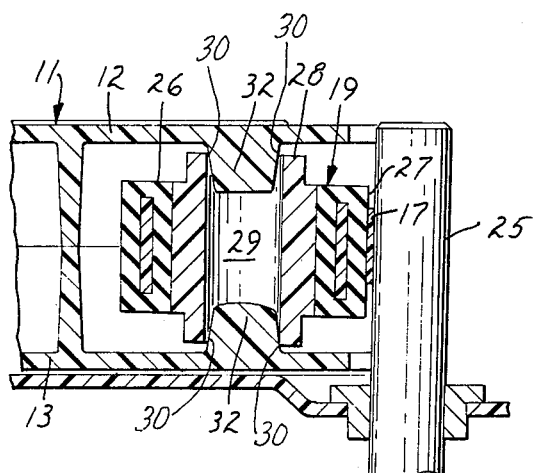
FIG. 4 is an enlarged cross sectional view similar to that of FIG. 3 but with the cartridge improperly aligned with the capstan.

The orientation of the frusto-conical outer surfaces of each node 32 causes a force biasing the roller 19 axially toward the other node 32 in response to a force applied radially of the roller to bias it against the nodes 32 as by the drive capstan 25. When a differential force is applied across the width of the preipheral surface of the roller 19 (as by the capstan 25 of a machine in which the cartridge is positioned when the capstan 25 is not axially parallel with the roller 19) a greater force will be caused at one of the edge bearing surfaces 30 than at the other, causing the roller to shift axially. Because of the slanted configuration of the nodes 32, axial movement of the roller 19 will cause the roller to tilt and move into axially parallel alignment with the drive capstan 25 where the forces at the edge bearing surfaces 30 will be equal. Accordingly, if the cartridge 10 is placed in a record-/reproduce magnetic tape player in an improper condition that does not provide good alignment between the cartridge and the cartridge engaging portions of the player, the pinch roller 19 has the capacity of self-aligning itself with the capstan 25 as shown in FIG. 4.

Figure 5:
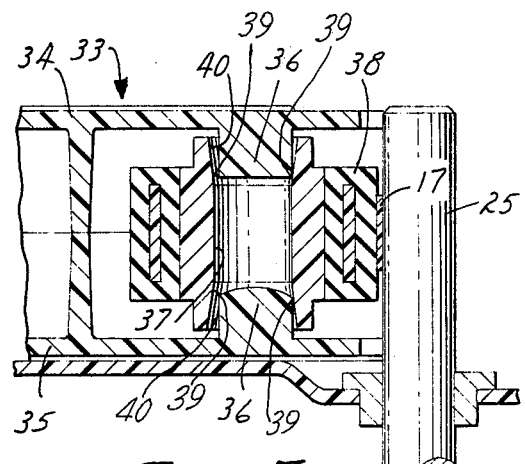
FIG. 5 is an enlarged cross sectional view similar to that of FIG. 3 but showing a modification of the cartridge of FIG. 1.

Although it is preferable to employ the nodes 32 having a slanted construction, such construction is not essential to the present invention and instead a cartridge 33, as shown in FIG. 5, that is a modified embodiment of the present invention may be employed. The cartridge 33 has casing members 34 and 35 with nodes 36 that are not slanted. The nodes 36 are cylindrical in shape and have circular edge bearing surfaces 39 at their distal ends adapted to engage frusto-conical bearing surfaces 40 defining end portions of a bore 37 of a roller 38. The frusto-conical bearing surfaces 40 increase in diameter away from the center of the roller and have a diameter larger than the diameter of the edge bearing surfaces 39 so that they engage the edge bearing surfaces 39 at only one position around their periphery. Also the ends of the roller 38 are spaced at a distance less than the distance between the casing members 34 and 35 to permit axial movement of the entire roller 38 into axially parallel alignment with the capstan 25 of the machine into which the cartridge is inserted in the manner described above.

What is claimed is:

1. In a tape cartridge including a case including opposed spaced apart sidewalls, a length of tape, support means in said case supporting said tape for movement along a path within said case past a tape drive station, said cartridge being adapted to be received in a recording and/or reproducing machine which machine includes a tape drive capstan positioned to engage one side of the tape at said tape drive station, said support means including a roller having a cylindrical peripheral surface and means for mounting said roller between said sidewalls at said drive station with said peripheral surface supporting the side of said tape opposite the side engaged by said drive capstan when the cartridge is inserted in a said machine, the improvement wherein: said means for mounting said roller comprises interacting portions of said sidewalls and roller providing bearing surfaces in continuous engagement at two locations spaced axially along said roller when said roller supports the tape against a said drive capstan, said bearing surfaces at each of said locations comprising one frusto-conical bearing surface and one circular edge bearing surface, said circular edge bearing surface having a diameter causing it to make engagement at only one position around its periphery when pressed against said frusto-conical surface, said frusto-conical surface being oriented to cause a force biasing said roller axially toward the other of said locations in response to a force applied radially of said roller to bias said bearing surfaces together, and said means for mounting allows movement of said roller in either axial direction from a normal position with the axis of said roller generally normal to said sidewalls to change both of said spaced locations axially of said frusto-conical surfaces in response to differential forces applied across the width of tape on one side of the peripheral surface by the capstan in a said machine in which the cartridge is positioned, thereby causing tilting of the axis of the roller into parallel alignment with the axis of the drive capstan.

2. A tape cartridge according to claim 1 wherein said portions of said sidewalls are opposed inwardly extending axially aligned frusto-conical projections decreasing in diameter toward each other, the outer surfaces of which projections provide said frusto-conical bearing surfaces, said portions of said roller are axially projecting endwalls having openings adapted to receive said projections with inlet edges of said opening at both ends of said roller providing said circular edge bearing surfaces and having diameters larger than those of said projections, and the bases of said projections are spaced at a distance greater than the edge surfaces at the opposite ends of said roller to afford axial movement of said roller within said case.

3. A tape cartridge according to claim 1 wherein said portions of said sidewalls are opposed inwardly extending axially aligned projections having circular edges at their distal ends providing said circular edge bearing surfaces, said portions of said rollers are endwalls having axially aligned frusto-conical openings coaxial with said peripheral surface and increasing in diameter away from the center of said roller, the surfaces defining said frusto-conical openings providing said frusto-conical bearing surfaces which have a diameter larger than the diameter of said circular edge surface, the ends of said roller being spaced at a distance less than the distance between said sidewalls at the base of said projection to afford axial movement of said roller within said case.

* * * * *